United States Patent
Hsu Li

(10) Patent No.: US 6,687,513 B1
(45) Date of Patent: Feb. 3, 2004

(54) DEVICE FOR ATTACHING PORTABLE PHONES TO VEHICLE

(76) Inventor: Hsiu-Chu Hsu Li, P.O. Box 4-67, Hsin Chuang, Taipei (TW), 242

( * ) Notice: Subject to any disclaimer, the term of this patent is extended or adjusted under 35 U.S.C. 154(b) by 7 days.

(21) Appl. No.: 10/286,920

(22) Filed: Oct. 30, 2002

(51) Int. Cl.[7] .............................. H04B 1/38; H04M 1/00
(52) U.S. Cl. ...................... 455/557; 455/90.1; 455/569; 455/569.1; 455/556.1; 455/550.1; 455/575.1; 379/433.13; 379/428.01; 379/420.04; 379/420.06; 379/446; 379/447
(58) Field of Search ................................ 455/90.1, 575, 455/556.1, 557, 569, 550, 550.1; 379/446, 429, 447, 433.13, 454, 455, 420.04, 428, 428.01, 557

(56) References Cited

U.S. PATENT DOCUMENTS

| | | | | |
|---|---|---|---|---|
| 5,282,246 A | * | 1/1994 | Yang | 379/455 |
| 5,388,155 A | * | 2/1995 | Smith | 379/446 |
| 5,535,274 A | * | 7/1996 | Braitberg et al. | 379/446 |
| 5,659,887 A | * | 8/1997 | Ooe | 455/575 |
| 5,694,468 A | | 12/1997 | Hsu | 379/446 |
| 5,805,672 A | | 9/1998 | Barkat et al. | 379/67 |
| 5,940,502 A | * | 8/1999 | Hirai et al. | 379/446 |
| 6,052,603 A | * | 4/2000 | Kinzalow et al. | 455/557 |
| 6,058,184 A | * | 5/2000 | Frank | 379/420.02 |
| 6,226,497 B1 | * | 5/2001 | Guntzer et al. | 455/66 |
| 6,229,891 B1 | * | 5/2001 | Chen | 379/446 |
| 6,424,842 B1 | * | 7/2002 | Winstead | 455/557 |

FOREIGN PATENT DOCUMENTS

FR  WO 9422234  * 9/1994 ............ H04B/1/38

* cited by examiner

Primary Examiner—Lee Nguyen
Assistant Examiner—Marceau Milord

(57) ABSTRACT

A device includes a pair of arms attached to a housing for securing a portable phone to vehicles, a circuit board received in the housing and having two or more couplers for coupling to a microphone, a speaker, and for allowing the users to speak and to receive the phones without carrying the portable phone. The portable phone may be easily and readily attached to the vehicle and electrically coupled to the electric power of vehicle with a plug which may be secured to the housing with a universal joint. Various adapters may be used to selectively couple to different phones.

7 Claims, 6 Drawing Sheets

DEVICE FOR ATTACHING PORTABLE PHONES TO VEHICLE

BACKGROUND OF THE INVENTION

1. Field of the Invention

The present invention relates to an attaching device, and more particularly to an attaching device for attaching portable phones or cell phones or mobile phones to vehicles.

2. Description of the Prior Art

Typical portable phone attaching devices have been developed to attach or secure portable phones or cell phones or mobile phones to vehicles. One example of the typical portable phone attaching device is disclosed in U.S. Pat. No. 5,694,468 to Hsu and comprises a pair of resilient or clamping arms for clamping the portable phones and for attaching or securing the portable phones to the vehicles.

However, the drivers or the passengers of the vehicles may not suitably use or speak the portable phones when the portable phones are attached or supported on the portable phone attaching device. In addition, the portable phones may not be easily coupled to the electric power of the vehicles.

U.S. Pat. No. 5,805,672 to Barkat et al. discloses a typical device for coupling the portable phones to the vehicles, such as for coupling the, portable phones to the electric power of the vehicles, and for allowing the users to speak the portable phones with a speaker or microphone, without carrying the portable phones.

However, the users or the drivers or the passengers may have to couple the data adapter and the voice processor and the speaker and the portable phone with a number of wires. In addition, it will be difficult to attach or to support the data adapter and the voice processor and the speaker and the portable phone in the vehicle.

The present invention has arisen to mitigate and/or obviate the afore-described disadvantages of the conventional portable phone attaching devices.

SUMMARY OF THE INVENTION

The primary objective of the present invention is to provide a portable phone attaching device for attaching portable phones or cell phones or mobile phones to vehicles, and for easily and readily coupling the portable phones to the electric power of the vehicles.

The other objective of the present invention is to provide a portable phone attaching device for attaching the portable phones to the vehicles, and for allowing the users to speak the phone without carrying the portable phones.

The further objective of the present invention is to provide a portable phone attaching device for attaching the portable phones to the vehicles, and for allowing the portable phones to be easily directed toward the users.

In accordance with one aspect of the invention, there is provided an attaching device comprising a housing, a pair of arms attached to the housing for supporting portable phone, a circuit board received in the housing, and including a first coupler for coupling to the portable phone, and including a second coupler, a third coupler attached thereto, a microphone coupled to the second coupler of the circuit board for speaking the portable phone, a speaker coupled to the third coupler of the circuit board for receiving incoming phones from the portable phone, and means for coupling the housing to electric power of vehicle, such that the portable phone may be easily and readily attached to the vehicle and electrically coupled to the electric power of vehicle.

The housing includes a hub provided therein, the speaker includes an extension having a duct provided thereon and rotatably secured to the hub, for rotatably securing the speaker to the housing.

An adapter may further be provided and coupled to the first coupler of the circuit board, for coupling to the portable phone.

The coupling means includes a seat secured to the housing, and a plug adjustably secured to the seat with a joint, for plugging to the electric power of the vehicle.

The seat includes a socket provided thereon, the plug includes a ball rotatably and adjustably received in the socket.

The seat includes a catch attached thereto, the housing includes an opening formed therein for receiving the catch.

The housing includes a lock slot formed therein, and communicating with the opening thereof, the seat includes a rib extended therefrom for engaging into the lock slot of the housing, the catch is attached to the rib.

The coupling means includes a plug secured to the housing for plugging to the electric power of the vehicle, the plug includes a fourth coupler, the circuit board includes a fifth coupler coupled to the fourth coupler of the plug.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
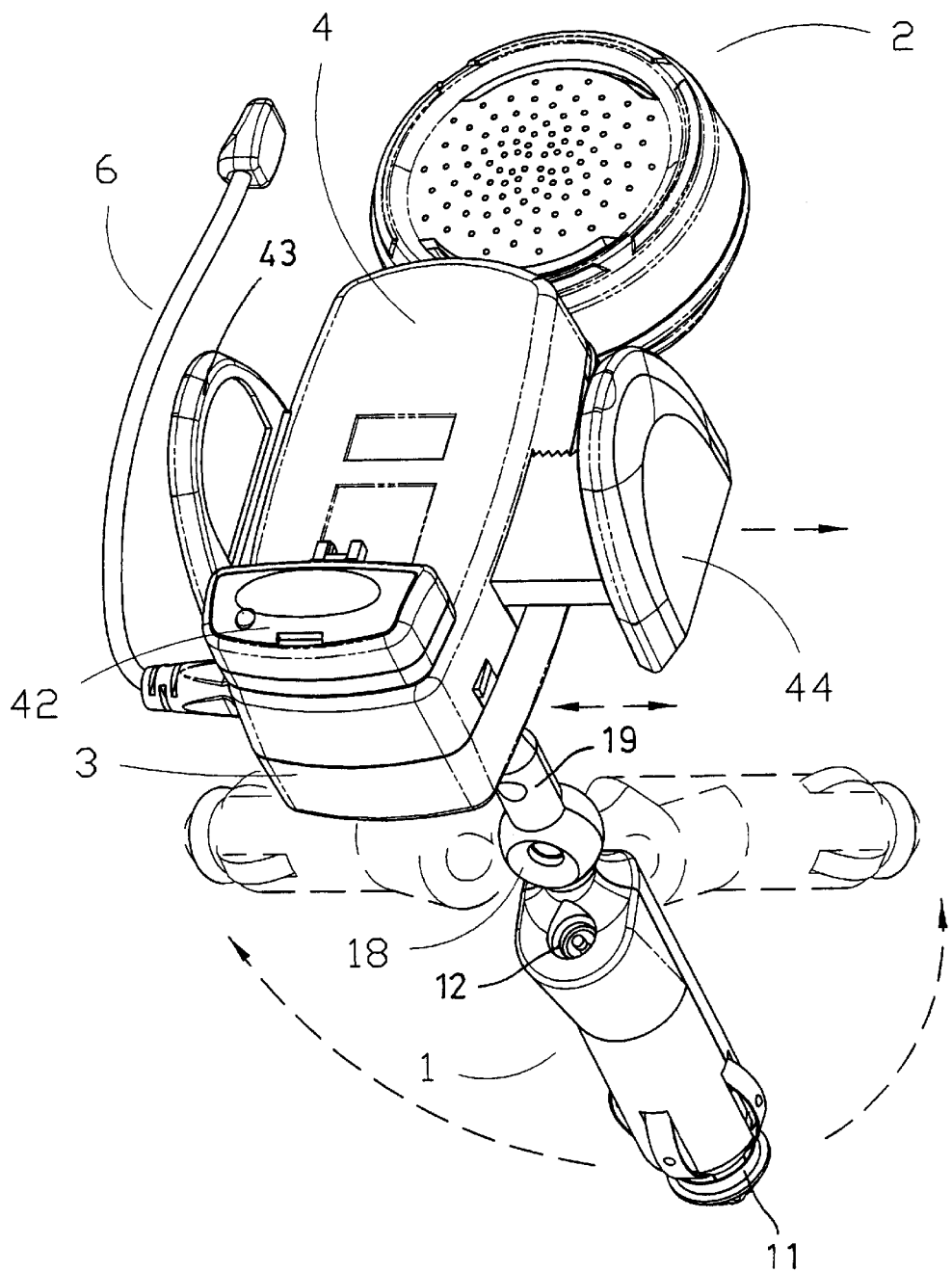
FIG. 1 is a front and bottom perspective view of a portable phone attaching device in accordance with the present invention.
Figure 2:
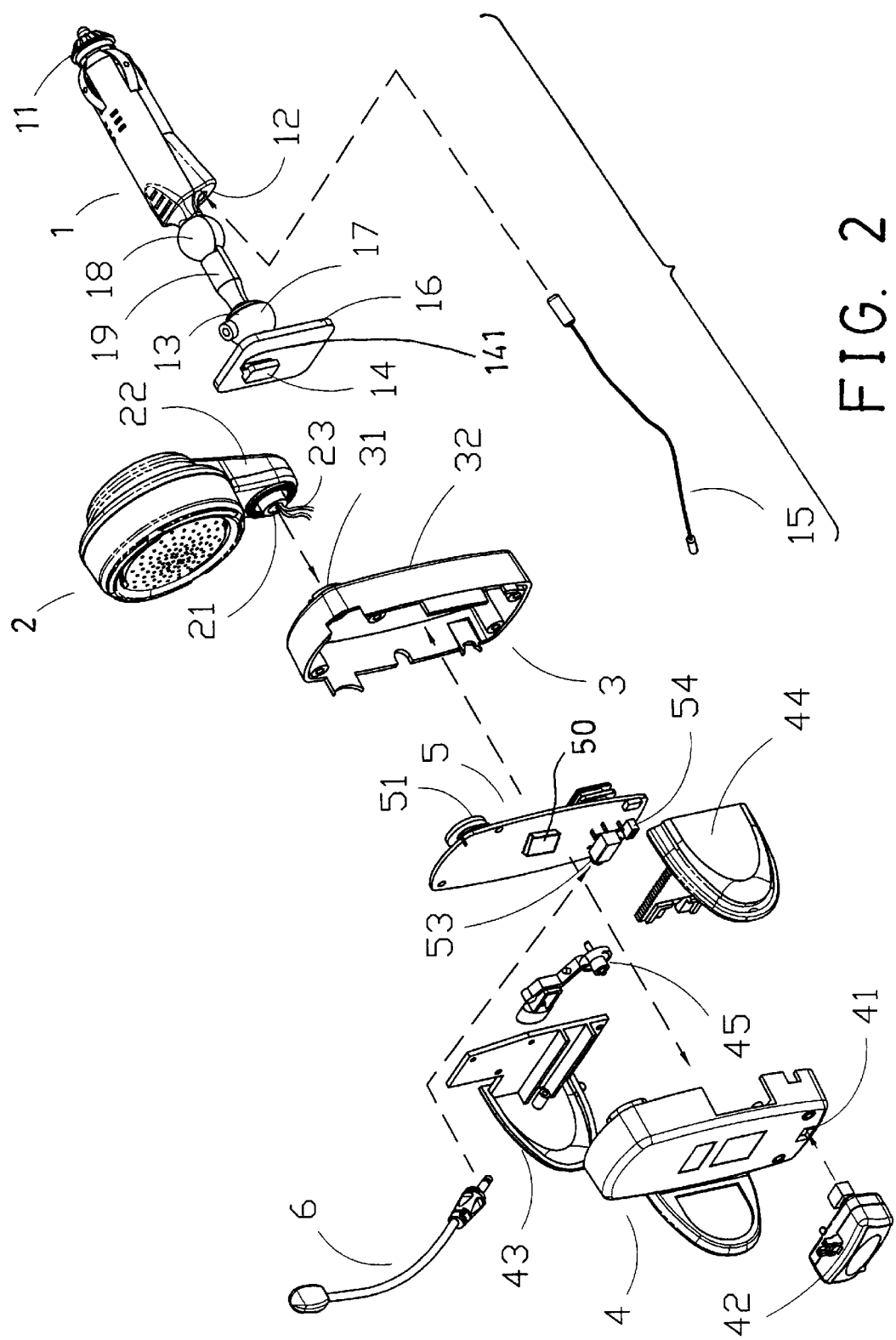
FIG. 2 is an exploded view of the portable phone attaching device as seen from the front portion thereof.
Figure 3:
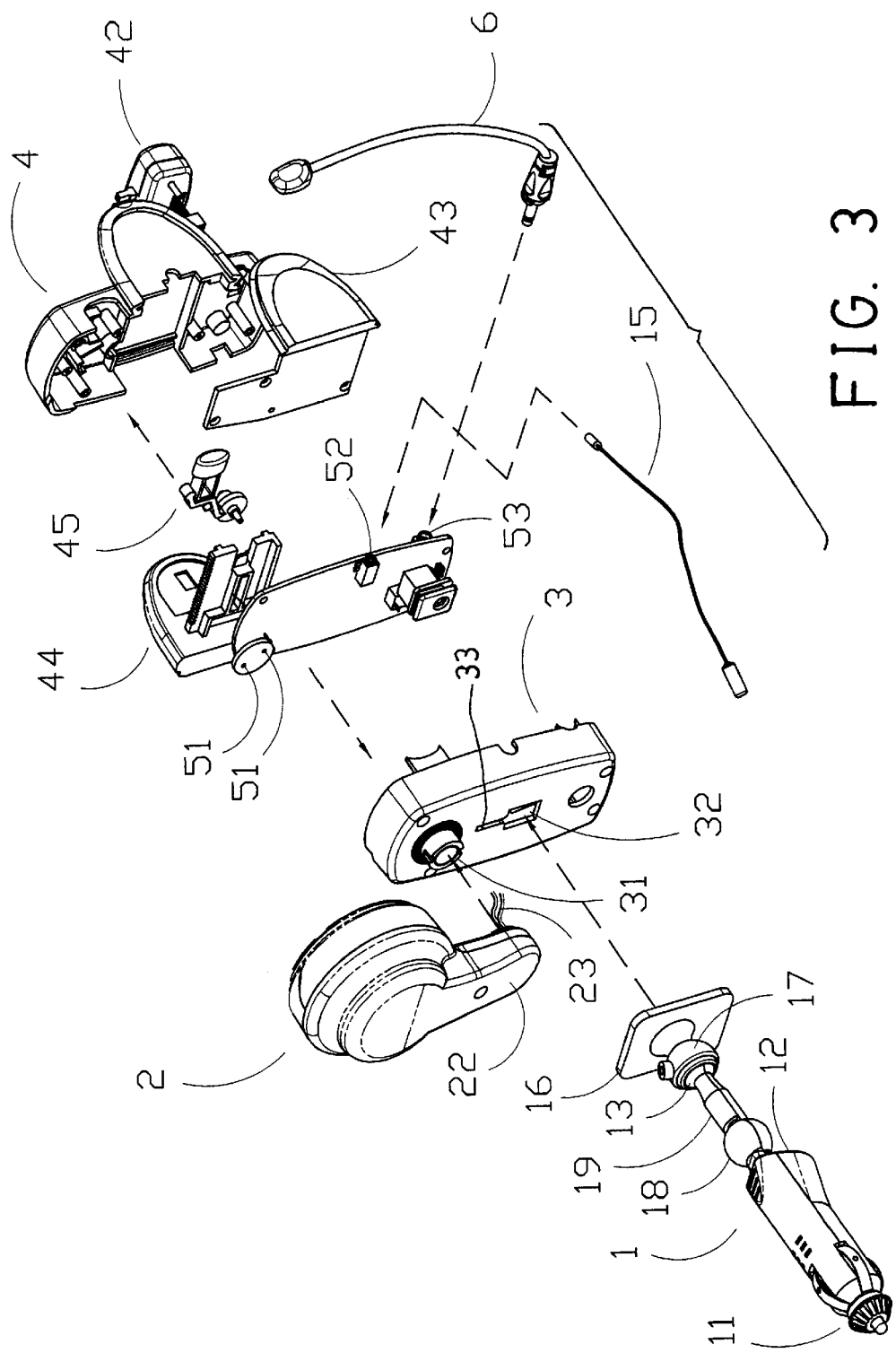
FIG. 3 is an exploded view of the portable phone attaching device as seen from the rear portion thereof.
Figure 4:
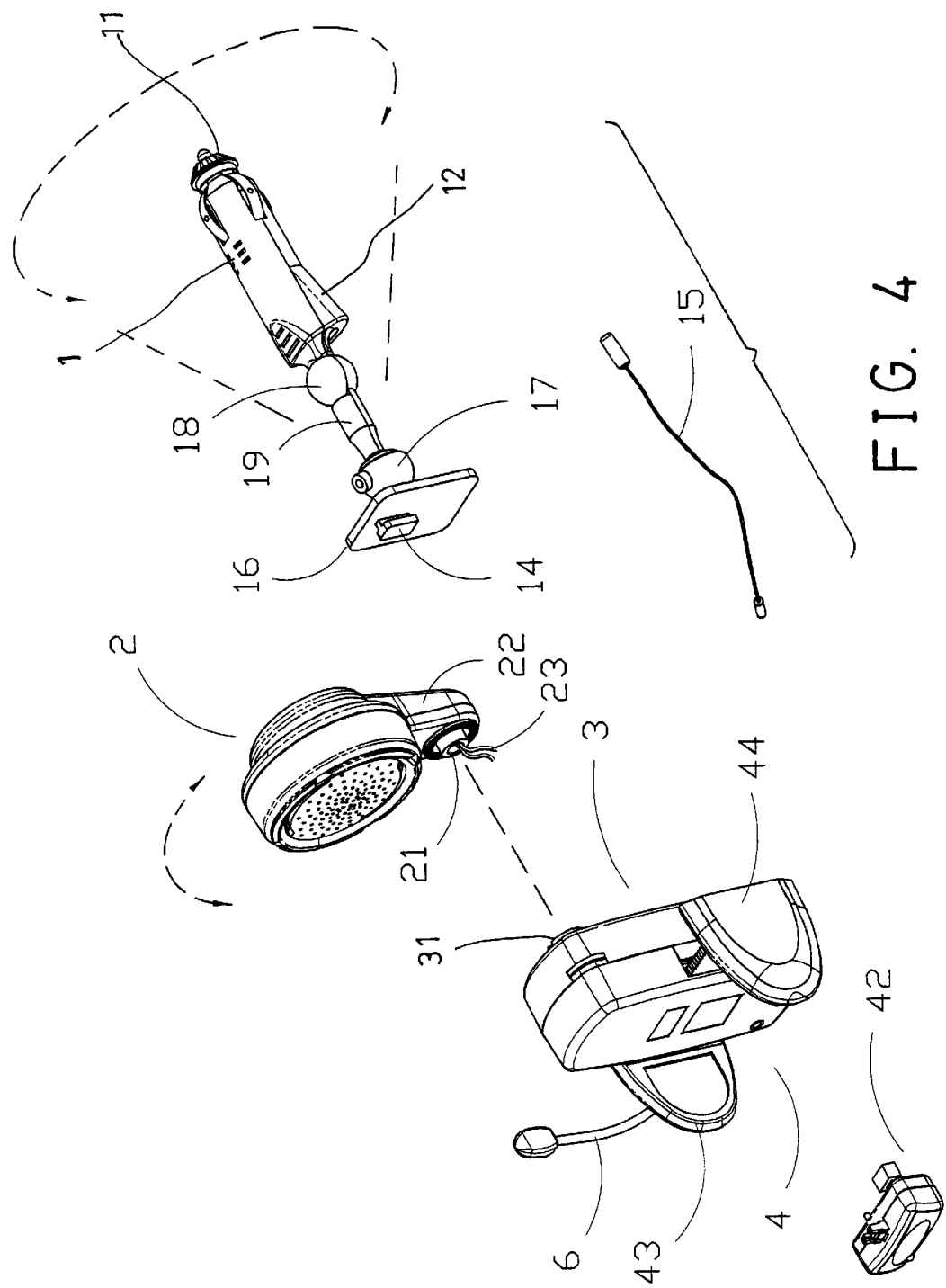
FIG. 4 is a partial exploded view of the portable phone attaching device as seen from the front portion thereof.

Referring to the drawings, and initially to FIGS. 1–4, a portable phone attaching device in accordance with the present invention comprises a housing 3, a circuit board 5 received and/or secured in the housing 3, and a cover 4 attached to the housing 3 for retaining the circuit board 5 in the housing 3.

A pair of arms 43, 44 are slidably attached to the housing 3 and/or the cover 4, and resiliently coupled together with a spring biasing device 45, for biasing the arms 43, 44 to clamp the typical or various portable phones or cell phones or mobile phones to the housing 3. One example of the resiliently clamping arms has been disclosed in U.S. Pat. No. 5,694,468 to Hsu which is taken as a reference for the present invention.

The housing 3 or the cover 4 of the housing 3 includes a socket or a coupler 41 provided therein for coupling to an adapter 42 or the other couplers that may be coupled or plugged to the portable phones. The portable phone attaching device in accordance with the present invention may comprise two or more adapters 42 for selectively coupling to the coupler 41, and for selectively coupling to various portable phones that are manufactured by different companies.

The circuit board 5 includes a processor device 50 attached thereto, a plug or socket or coupler 54 attached thereto for coupling to the adapter 42, and includes another plug or socket or coupler 53 attached thereto for coupling or plugging to a microphone 6, and for allowing the users to speak the portable phone with the microphone 6, without carrying the portable phone.

Figure 6:
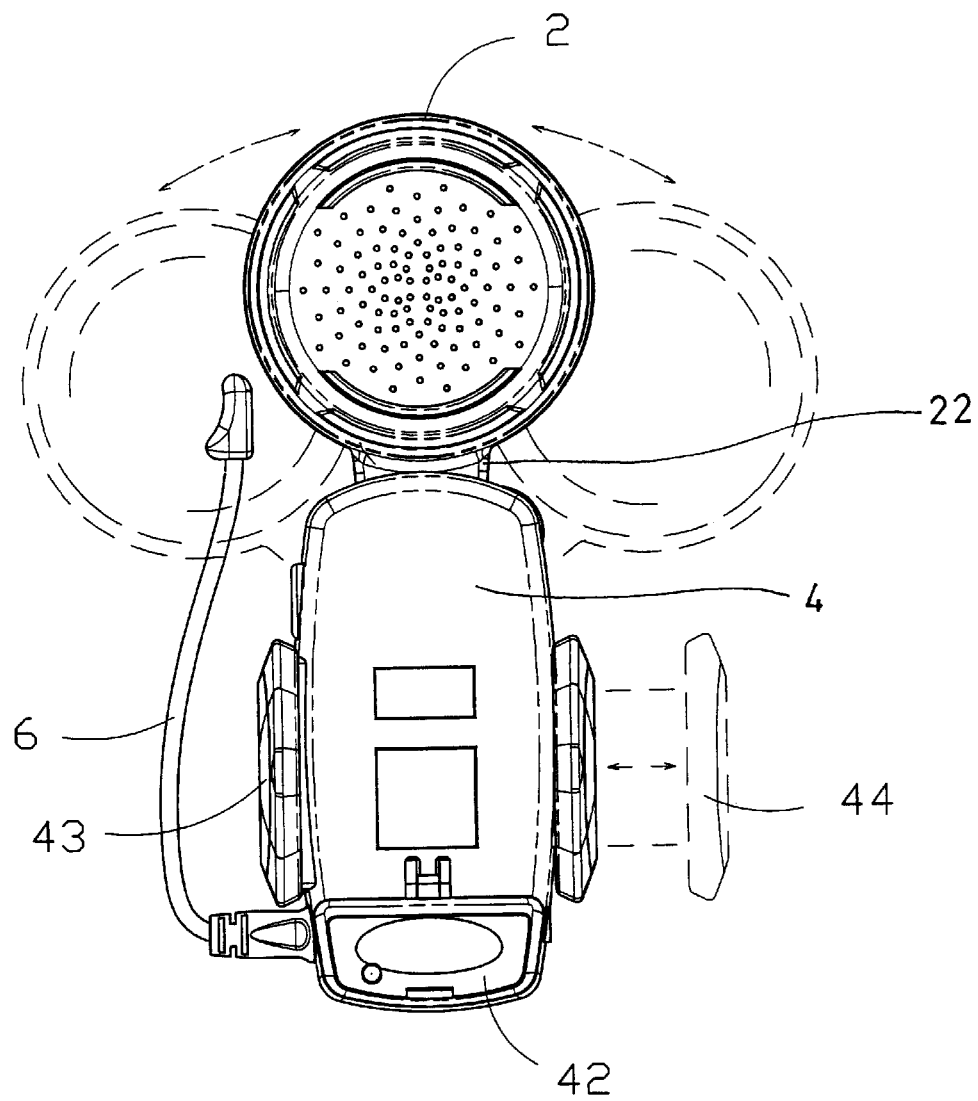
FIG. 6 is a front view illustrating the operation of the portable phone attaching device.

The circuit board 5 further includes a terminal or an adapter or another coupler 51 attached thereto and coupled to the processor device 50. The housing 3 includes a hub 31 (FIG. 3) provided therein. A speaker 2 includes a neck or an extension 22 having a duct 21 provided therein and rotatably secured to the hub 31 (FIG. 4), for allowing the speaker 2 to be rotated and adjusted relative to the housing 3 and the cover 4 (FIG. 6).

The speaker 2 includes one or more electric wires 23 coupled to the coupler 51 of the circuit board 5 for coupling to the processor device 50, and for allowing the users to receive or to hear the incoming phone with the speaker 2, without carrying the portable phone. The speaker 2 may also be adjusted relative to the housing 3 and to be disengaged from the other objects, and for allowing the incoming phones to be easily received or heard by the users.

The housing 3 includes an opening 32 and a lock slot 33 formed therein (FIG. 3) and communicating with each other. A seat 16 includes a catch 14 attached thereto and coupled thereto with a rib 141, and includes a socket 17 attached thereto and opposite to the catch 14 for rotatably receiving a ball 13 and for forming a universal or a ball joint 13, 17.

The catch 14 has a shape or an area or a width or a height equals to or slightly smaller than that of the opening 32 of the housing 32, for allowing the catch 14 to be engaged into the housing 3 via the opening 32 of the housing 3. The rib 141 includes a width smaller than that of the catch 14 for engaging into the relatively smaller lock slot 33, and for detachably securing the seat 16 to the housing 3.

Figure 5:
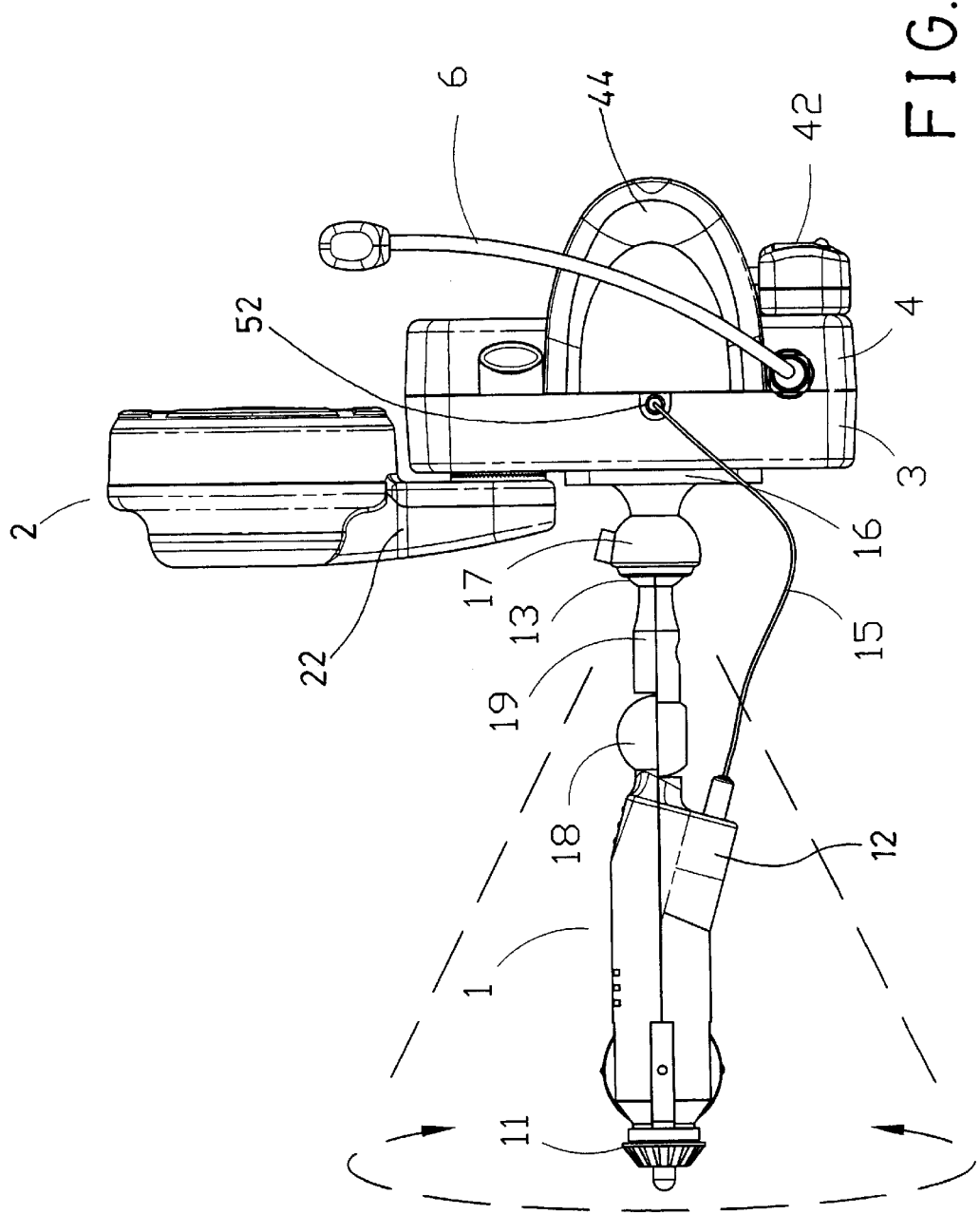
FIG. 5 is a side view illustrating the operation of the portable phone attaching device.

A stem 19 has one end secured to the ball 13 and thus rotatable relative to the seat 16 and the housing 3 with the ball joint 13, 17 (FIGS. 4, 5), and has another ball 18 attached or provided on the other end thereof which may be coupled to an adapter or a plug 1 which may be coupled to the electric power socket of the vehicle that is provided for igniting or energizing the typical cigarette lighter.

For example, the plug 1 includes one end 11 for coupling to the electric power source of the vehicle, and includes another plug or socket or coupler 12 attached thereto or provided therein. The circuit board 5 further includes a plug or a socket or a coupler 52 (FIG. 3) attached thereto. An electric coupling cable 15 has one end plugged or coupled to the coupler 12, and another end coupled to the coupler 52, for electrically coupling the elements of the circuit board 5 to the electric power source of the vehicle.

The microphone 6 and the speaker 2 and the other electric parts or elements that are attached to the circuit board 5 may be energized by the electric power of the vehicle via the electric coupling cable 15, for example. The portable phone may also be energized by the electric power of the vehicle via the electric coupling cable 15, or directly via the plug 1 itself, for example.

In operation, the plug 1 may be plugged to the electric power source of the vehicle, for easily and readily attaching and coupling the housing 3 and the circuit board 6 and the portable phone to the vehicle. The housing 3 may be adjusted relative to the vehicle with the ball joint 13, 17, and the speaker 2 may be rotated and adjusted relative to the housing 3 to the best direction for directing to the users. In addition, the users may speak the phone with the microphone 6 without carrying the portable phone.

After use, the portable phone and the housing 3 and the speaker 2 and the microphone 6 may all be easily, and quickly disengaged from the vehicle by disengaging or unplugging the plug 1 from the vehicle.

Accordingly, the portable phone attaching device in accordance with the present invention includes a structure for easily coupling the portable phones to the electric power of the vehicles, and for allowing the users to speak the phone without carrying the portable phones.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An attaching device comprising:
    a housing including a hub provided therein,
    a pair of arms attached to said housing for supporting portable phone,
    a circuit board received in said housing, and including a first coupler for coupling to the portable phone, and including a second coupler, a third coupler attached thereto,
    a microphone coupled to said second coupler of said circuit board for speaking the portable phone,
    a speaker coupled to said third coupler of said circuit board for receiving incoming phones from the portable phone, said speaker including an extension having a duct provided thereon and rotatably secured to said hub, for rotatably securing said speaker to said housing, and
    means for coupling said housing to electric power of vehicle.

2. The attaching device according to claim 1 further comprising an adapter coupled to said first coupler of said circuit board, for coupling to the portable phone.

3. An attaching device comprising:
    a housing,
    a pair of arms attached to said housing for supporting portable phone,
    a circuit board received in said housing, and including a first coupler for coupling to the portable phone, and including a second coupler, a third coupler attached thereto,
    a microphone coupled to said second coupler of said circuit board for speaking the portable phone,
    a speaker coupled to said third coupler of said circuit board for receiving incoming phones from the portable phone, and
    means for coupling said housing to electric power of vehicle, said coupling means including a seat secured to said housing, and a plug adjustably secured to said seat with a joint, for plugging to the electric power of the vehicle.

4. The attaching device according to claim 3, wherein said seat includes a socket provided thereon, said plug includes a ball rotatably and adjustably received in said socket.

5. The attaching device according to claim 3, wherein said seat includes a catch attached thereto, said housing includes an opening formed therein for receiving said catch.

6. The attaching device according to claim 5, wherein said housing includes a lock slot formed therein and communicating with said opening thereof, said seat includes a rib extended therefrom for engaging into said lock slot of said housing, said catch is attached to said rib.

7. An attaching device comprising:
   a housing,
   a pair of arms attached to said housing for supporting portable phone,
   a circuit board received in said housing, and including a first coupler for coupling to the portable phone, and including a second coupler, a third coupler attached thereto,
   a microphone coupled to said second coupler of said circuit board for speaking the portable phone,
   a speaker coupled to said third coupler of said circuit board for receiving incoming phones from the portable phone, and
   means for coupling said housing to electric power of vehicle, said coupling means including a plug secured to said housing for plugging to the electric power of the vehicle, said plug including a fourth coupler, said circuit board including a fifth coupler coupled to said fourth coupler of said plug.

* * * * *